United States Patent Office 2,697,715
Patented Dec. 21, 1954

2,697,715

PROCESS FOR SELECTIVE OXIDATION OF 17β-HYDROXY GROUP OF 6β-HYDROXYTESTOSTERONE

Samuel H. Eppstein, Galesburg, and Hazel Marian Leigh, Kalamazoo, Mich., assignors to The Upjohn Company, Kalamazoo, Mich., a corporation of Michigan No Drawing. Application July 16, 1953,
Serial No. 368,493

3 Claims. (Cl. 260—397.4)

The present invention relates to steroid compounds and is more particularly concerned with a novel process for the selective oxidation of the 17β-hydroxy group in 6β-hydroxytestosterone to a 17-keto group without oxidation of the 6β-hydroxy group and the 4-double bond, a process which may be represented by the formulae:

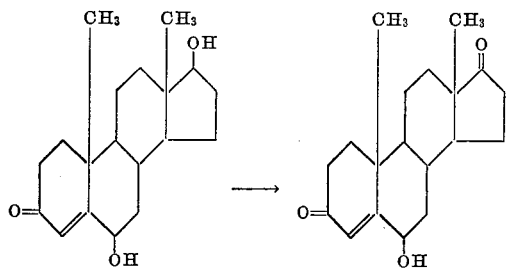

According to the novel process of the present invention for the selective oxidation of the 17β-hydroxy group in 6β-hydroxytestosterone to a 17-keto group without oxidation of the 6β-hydroxy group and the 4-double bond, 6β-hydroxytestosterone is oxidized with chromic acid at a temperature below 15 degrees centigrade, and the thus-produced 6β-hydroxy-4-androstene-3,17-dione is separated from the reaction mixture, the provision of this process and the product obtained being objects of this invention. The 6β-hydroxy-4-androstene-3,17-dione produced by the process of the present invention is physiologically active, having protein anabolic, renotropic, and anesthetic activity, and, in addition, may be oxidized to 4-androstene-3,6,17-trione [Butenandt, Ber., 69, 1163 (1936)] which possesses estrogenic activity. Other objects and uses of this invention will be apparent to one skilled in the art to which this invention pertains.

In carrying out the process of the present invention, 6β-hydroxytestosterone (which may be obtained by bio-oxidation of testosterone as shown in Preparation 1), dissolved in an organic solvent such as, for example, acetic acid, benzene, toluene, petroleum ether, dioxane, or other organic solvent, or mixtures thereof, with mixtures of acetic acid and benzene preferred, is oxidized with chromic acid. The chromic acid may be added as chromic acid anhydride together with a small, but sufficient, amount of water to produce the dichromate ion ($Cr_2O_7^=$), or may be produced in situ by the reaction between an alkali-metal dichromate such as sodium or potassium dichromate and an acid, for example, acetic acid, or sulfuric acid, etc. The reaction may be carried out in a heterogeneous or a homogeneous system. When the oxidation is carried out in a heterogeneous system, the 6β-hydroxytestosterone, dissolved in an organic solvent which is inert to oxidation under the reaction conditions, such as, for example, benzene, chlorobenzene, bromobenzene, chloroform, or other halogenated hydrocarbon, ethyl acetate, or a similar solvent, is admixed with a solution of aqueous sodium dichromate of potassium dichromate, acidified with sulfuric acid, or sulfuric acid combined with acetic acid. Vigorous agitation is then employed to bring the organic layer into intimate contact with the aqueous solution. The reaction time is dependent in part on efficient stirring. In the preferred embodiment of this invention, the oxidation is carried out in homogeneous solution, with a mixture of acetic acid and benzene as the solvent and the chromic acid being produced by the reaction of an alkali dichromate and acetic acid, or by small amounts of water and chromic anhydride. Whether the reaction is carried out in a homogeneous phase or in a heterogeneous phase, the temperature of the reaction mixture is kept below fifteen degrees centigrade, but above the freezing point of the mixture, preferably between about zero and about ten degrees centigrade. While highest yields are usually obtained when an amount of oxidant between about 1.0 and about 1.1 times the theoretical amount required to convert the 17β-hydroxy group to a 17-keto group is used, between about 0.8 and about 2.0 times the theoretical amount results in good yields. Larger amounts of oxidant can be used satisfactorily at low temperatures using a short reaction period. The reaction time depends in part on the temperature and may vary from about one-half hour to about ten hours, or even longer. At zero degrees centigrade, the reaction time is usually between about one and four hours. At the termination of the reaction, any unused amount of chromic acid may be destroyed by adding methyl or ethyl alcohol to the solution. The 6β-hydroxy-4-androstene-3,17-dione obtained is isolated from the reaction mixture by conventional procedure, e. g., by addition of water to the reaction mixture, then extraction with an organic solvent, for example, ether, ethyl acetate, chloroform, methylene dichloride, etc., and subsequent removal of the extraction solvent. The isolated product can be purified by recrystallization, chromatography, etc., if desired.

The following examples are illustrative of the processes and products of the present invention, but are not to be construed as limiting.

PREPARATION 1.—6β-HYDROXYTESTOSTERONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. To 120 liters of this sterilized medium, there was added an inoculum of *Rhizopus reflexus*, American Type Culture Collection Number 1225, and the medium was incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium, containing a 24-hour growth of *Rhizopus reflexus*, was added sixty grams of testosterone dissolved in one liter of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts were added to the beer filtrate. The combined extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The residue was dissolved in hot ethyl acetate and cooled to room temperature to produce crystals. The crystals were recrystallized from ethyl acetate to give four grams of material having a softening point of 205 degrees centigrade and a melting point of 214 to 216 degrees centigrade. Recrystallization twice more resulted in crystals of 6β-hydroxytestosterone having a melting point of 216 to 220 degrees centigrade:

*Analysis.*—Percent calculated for $C_{19}H_{28}O_3$: C, 74.96; H, 9.27. Found: C, 75.35; H, 9.32.

Example 1.—6β-hydroxy-4-androstene-3,17-dione

Four hundred milligrams (400 milligrams) (1.31 millimoles) of 6β-hydroxytestosterone, dissolved in a mixture of 5.2 milliliters of acetic acid and 5.2 milliliters of benzene, were cooled to zero degrees centigrade. Thereto was added with continuous stirring a solution of 130.6 milligrams (0.438 millimoles) of sodium dichromate (capable of yielding 0.667 millimoles of oxygen) in 2.6 milliliters of acetic acid. After continuous stirring of the reaction mixture at zero degrees centigrade for a period of four hours, seventy-five milliliters of ice water were added and the mixture was extracted with four 25-milliliter portions of methylene dichloride. The combined extracts were washed with three ten-milliliter portions of one-normal sodium carbonate solution and then with two ten-milliliter portions of water. After the solution had been dried over anhydrous sodium sulfate, the solvent was evaporated and the residue was recrystallized from a solution consisting of five milliliters of ethyl-acetate plus five milliliters of normal-hexane. The thus-obtained 6β-hydroxy-4-androstene-3,17-dione weighed 276 milligrams which is equal to a yield of seventy percent; melting point 189 to 194 degrees centigrade. Analysis, infrared spectra and paper chromatography showed the product to be 6β-hydroxy-4-androstene-3,17-dione.

Example 2.—6β-hydroxy-4-androstene-3,17-dione

Two hundred milligrams (200 milligrams) of 6β-hydroxytestosterone, dissolved in a mixture of 5.2 milliliters of acetic acid and 5.2 milliliters of benzene was oxidized with a solution of 261.2 milligrams of sodium dichromate at zero degrees centigrade in the same manner shown in Example 1. The crude product was dissolved in four milliliters of benzene and chromatographed over four grams of alumina. By elution with benzene, benzene-ether, ether, and ether-chloroform, 62 milligrams of 6β-hydroxy-4-androstene-3,17-dione were obtained.

Example 3.—6β-hydroxy-4-androstene-3,17-dione

A solution of 6β-hydroxytestosterone in chlorobenzene was agitated for four hours with an aqueous solution of sodium dichromate and sulfuric acid at room temperature (22.5 degrees centigrade). The chlorobenzene layer was separated from the aqueous solution, washed, dried over anhydrous sodium sulfate, and evaporated under reduced pressure to yield 6β-hydroxy-4-androstene-3,17-dione which was purified by recrystallization from an ethyl acetate-hexane mixture.

It is to be understood that the invention is not to be limited to the exact details of operation shown and described, as obvious modifications and equivalents will be apparent to one skilled in the art, and the invention is therefore to be limited only by the scope of the appended claims.

We claim:

1. A process for the selective oxidation of the 17β-hydroxy group in 6β-hydroxytestosterone to a 17-keto group without oxidation of the 6β-hydroxy group and the 4-double bond which comprises: reacting 6β-hydroxytestosterone with chromic acid at a temperature below fifteen degrees centigrade and separating the thus-produced 6β-hydroxy-4-androstene-3,17-dione.

2. A process for the selective oxidation of the 17β-hydroxy group in 6β-hydroxytestosterone to a 17-keto group without oxidation of the 6β-hydroxy group and the 4-double bond which comprises: reacting 6β-hydroxytestosterone with between about 0.8 and about 2.0 times the theoretical amount of chromic acid required to convert the 17β-hydroxy group to a 17-keto group in an organic solvent at a temperature below fifteen degrees centigrade, and separating the thus-produced 6β-hydroxy-4-androstene-3,17-dione.

3. A process for the selective oxidation of the 17β-hydroxy group in 6β-hydroxytestosterone to a 17-keto group without oxidation of the 6β-hydroxy group and the 4-double bond which comprises: reacting 6β-hydroxytestosterone with between about 1.0 and about 1.1 times the theoretical amount of chromic acid required to convert the 17β-hydroxy group to a 17-keto group, in an organic solvent at a temperature between about zero and about ten degrees centigrade and separating the thus-produced 6β-hydroxy-4-androstene-3,17-dione.

No references cited.